US012485301B2

(12) United States Patent
Monahan et al.

(10) Patent No.: US 12,485,301 B2
(45) **Date of Patent: *Dec. 2, 2025**

(54) ARTICULATED HARNESS CONNECTION ARRANGEMENT WITH INTEGRATED ATTACHMENT ELEMENT

(71) Applicant: MSA Technology, LLC, Cranberry Township, PA (US)

(72) Inventors: Michael D. Monahan, Allison Park, PA (US); Mark Hall, Natrona Heights, PA (US); Eduardo José Ferreira Dodge, Brasilia (BR)

(73) Assignee: MSA Technology, LLC, Cranberry Township, PA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/310,567

(22) Filed: May 2, 2023

(65) Prior Publication Data

US 2023/0302310 A1 Sep. 28, 2023

Related U.S. Application Data

(63) Continuation of application No. 16/911,506, filed on Jun. 25, 2020, now Pat. No. 11,660,476.

(Continued)

(51) Int. Cl.
*A62B 35/00* (2006.01)
*A44B 11/00* (2006.01)

(52) U.S. Cl.
CPC ........ *A62B 35/0025* (2013.01); *A44B 11/006* (2013.01); *A62B 35/0018* (2013.01)

(58) Field of Classification Search
CPC ............ A44B 11/2519; A44B 11/2546; A44B 11/2549; A44B 11/2553; A44B 11/266;
(Continued)

(56) References Cited

U.S. PATENT DOCUMENTS 2,108,716 A 2/1938 Kuhlemann
4,406,043 A 9/1983 Friedman
(Continued)

FOREIGN PATENT DOCUMENTS

CA 2504473 10/2005
CA 2488288 5/2006
(Continued)

OTHER PUBLICATIONS

Chinese Office Action, Appl. 202080047213.3, Jun. 22, 2022.

*Primary Examiner* — David M Upchurch
(74) *Attorney, Agent, or Firm* — Jones Day

(57) ABSTRACT

A connection arrangement for use with a wearable body harness includes a first connector having a first body component, a second body component, and an attachment element connected to each other by a rod having a longitudinal axis. The connection arrangement further includes a second connector removably connectable to the first connector. Each of the first body component, the second body component, and the attachment element are independently movable relative to each other about the longitudinal axis of the rod. The first connector and the second connector are removably connectable to each other via a locking and release mechanism between a first, locked configuration, where the first connector and the second connector are connected to each other, and a second, unlocked configuration, where the first connector and the second connector are disconnected from each other.

24 Claims, 10 Drawing Sheets

Related U.S. Application Data

(60) Provisional application No. 62/868,487, filed on Jun. 28, 2019.

(58) Field of Classification Search
CPC .............. A44B 11/006; A62B 35/0025; A62B 35/0018; A62B 35/0037
See application file for complete search history.

(56) References Cited

U.S. PATENT DOCUMENTS

| | | | | |
|---|---|---|---|---|
| 4,458,390 | A * | 7/1984 | Fogelson | A44B 11/12 24/182 |
| 4,713,864 | A | 12/1987 | Hess | |
| 6,041,444 | A | 3/2000 | McKinney | |
| 6,253,874 | B1 * | 7/2001 | Casebolt | B64D 17/30 182/6 |
| 6,457,774 | B2 | 10/2002 | Baloga | |
| 6,871,766 | B2 | 3/2005 | Nordstrom | |
| 6,971,476 | B2 | 12/2005 | Wolner et al. | |
| 7,036,157 | B1 | 5/2006 | Andersson et al. | |
| 7,073,627 | B2 | 7/2006 | Casebolt et al. | |
| 7,144,086 | B1 | 12/2006 | Harcourt et al. | |
| 7,178,632 | B2 | 2/2007 | Casebolt et al. | |
| 7,252,342 | B2 | 8/2007 | Patrizi et al. | |
| D595,183 | S | 6/2009 | Nelson et al. | |
| 8,328,289 | B2 | 12/2012 | Tharp | |
| 8,408,656 | B2 | 4/2013 | Carpenter | |
| 8,418,898 | B2 | 4/2013 | Carlsson et al. | |
| 8,776,324 | B2 | 7/2014 | Steck et al. | |
| 8,974,005 | B2 | 3/2015 | Mason et al. | |
| 9,067,561 | B2 | 6/2015 | Crews | |
| 9,173,454 | B2 | 11/2015 | Liu | |
| 9,174,071 | B2 | 11/2015 | Seman et al. | |
| 9,192,145 | B2 | 11/2015 | Kissel, Jr. | |
| 9,254,816 | B2 | 2/2016 | You | |
| 9,399,417 | B1 | 7/2016 | Grey et al. | |
| 9,457,208 | B2 | 10/2016 | Seman et al. | |
| 9,560,898 | B2 | 2/2017 | Hortnagl | |
| 9,713,968 | B1 | 7/2017 | Richardson et al. | |
| 10,035,029 | B2 | 7/2018 | Dawson | |
| 10,376,021 | B2 * | 8/2019 | Hsu | A44B 11/2573 |
| 10,850,142 | B2 | 12/2020 | Emonin | |
| 2003/0062218 | A1 | 4/2003 | Zeissler et al. | |
| 2005/0121568 | A1 | 6/2005 | Youngberg | |
| 2006/0005293 | A1 | 1/2006 | Frey et al. | |
| 2006/0102423 | A1 | 5/2006 | Lang et al. | |
| 2007/0062760 | A1 | 3/2007 | Wolner | |
| 2010/0025148 | A1 | 2/2010 | Dawson | |
| 2010/0244543 | A1 | 9/2010 | Fine et al. | |
| 2011/0113520 | A1 | 5/2011 | Dennis | |
| 2012/0019043 | A1 | 1/2012 | Merrill et al. | |
| 2014/0298630 | A1 | 10/2014 | Hortnagl | |
| 2015/0191147 | A1 | 7/2015 | Cobb | |
| 2016/0059053 | A1 | 3/2016 | Seman et al. | |
| 2017/0049218 | A1 | 2/2017 | Moncreiff | |
| 2017/0120087 | A1 | 5/2017 | Cowell et al. | |
| 2017/0216635 | A1 * | 8/2017 | Stibilj | A62B 35/0018 |
| 2017/0291046 | A1 | 10/2017 | Bouquier | |
| 2019/0070442 | A1 | 3/2019 | Jacob | |
| 2019/0070443 | A1 | 3/2019 | Hetrich et al. | |

FOREIGN PATENT DOCUMENTS

| | | |
|---|---|---|
| CA | 2387758 | 2/2010 |
| CA | 2535824 | 6/2010 |
| CA | 2573356 | 3/2014 |
| CA | 2672244 | 9/2014 |
| CA | 2792321 | 4/2015 |
| CN | 102711544 | 10/2012 |
| CN | 108114386 | 6/2018 |
| DE | 9400218 | 2/1994 |
| DE | 102013222372 | 5/2015 |
| EP | 1162107 | 12/2001 |
| EP | 1222004 | 12/2005 |
| EP | 1200028 | 10/2006 |
| EP | 1768752 | 4/2007 |
| EP | 1660191 | 5/2011 |
| EP | 2789252 | 10/2014 |
| EP | 1660192 | 11/2015 |
| EP | 2724752 | 3/2017 |
| EP | 3162411 | 5/2017 |
| EP | 3017847 | 7/2017 |
| EP | 2892766 | 10/2017 |
| FR | 2945221 | 11/2010 |
| WO | WO 2006/017350 | 2/2006 |
| WO | WO 2012/063064 | 5/2012 |
| WO | WO 2015/166224 | 11/2015 |
| WO | WO 2016/175663 | 11/2016 |

* cited by examiner

ARTICULATED HARNESS CONNECTION ARRANGEMENT WITH INTEGRATED ATTACHMENT ELEMENT

CROSS REFERENCE TO RELATED APPLICATION

This application is a continuation application of U.S. patent application Ser. No. 16/911,506, filed Jun. 25, 2020, which claims priority to U.S. Provisional Application No. 62/868,487, filed Jun. 28, 2019, both of which are incorporated herein by reference in their entireties.

TECHNICAL BACKGROUND

Technical Field

The present disclosure relates generally to wearable safety harnesses and, in particular, to an articulated harness connection arrangement with an integrated attachment element for use with wearable safety harnesses.

Technical Considerations

As is known in the art, there exist various safety devices and arrangements that can be worn by or attached to a user to ensure the user's safety in certain situations. Such mechanisms come in many forms, including, but not limited to, harnesses and safety belts. Full body harnesses are widely used for lifting and lowering individuals in dangerous situations and as a primary component in a personal fall arrest system. These harnesses can also be used for work positioning, travel restriction, ladder climbing, rescue retrieval, and evacuation. While full body harnesses are used mainly in an industrial setting, particularly the construction industry where the likelihood and danger of falls from heights is both numerous and significant, a full body harness can be used in various other applications in which total suspension and support of the body must be ensured, either expectedly or unexpectedly.

While there are many variations in full body harness construction, all typically include a plurality of elongated straps that are combined together to fit around a user's body. In some embodiments or aspects, a full body harness may have an attachment point (D-ring) typically positioned in a central portion of the user's back or chest, and a plurality of straps routed around predetermined portions of the user's body in such a manner as to hold or suspend the user in the event of a fall. One or more straps of the harness may be removably connected together by a connector, such as a buckle.

While a variety of connectors exist in the art for connecting the straps of the harness, there is a continued need in the art for improved connectors. For example, there is a need for improved connectors that prevent tangling of harness straps. There is a further need in the art for improved connectors that can be easily and effectively connected and disconnected to allow quick donning and removal of the harness. There is also a need for improved connectors with increased safety compliance and redundant safety mechanisms.

SUMMARY

Generally, provided is an improved body harness having an improved harness connection arrangement. In some non-limiting embodiments or aspects, provided is an improved harness having a harness connection arrangement that can be easily and effectively worn by the user in a variety of work environments without compromising the user's ability to move. Preferably, provided is a harness having a connector for connecting at least two straps of the harness, wherein the connector can be easily and effectively connected and disconnected to allow quick donning and removal of the harness. Preferably, provided is an improved harness having a harness connection arrangement that not only leads to increased safety compliance at the worksite, but also provides increased effectiveness and safety to the user.

In some non-limiting embodiments or aspects, a connection arrangement for use with a wearable body harness may include a first connector having a first body component, a second body component, and an attachment element to each other connected by a rod having a longitudinal axis. The connection arrangement further may include a second connector removably connectable to the first connector. Each of the first body component, the second body component, and the attachment element may be independently movable relative to each other about the longitudinal axis of the rod.

In some non-limiting embodiments or aspects, the first body component may have a tab with a first through opening having a first axis that is coaxial with the longitudinal axis of the rod, wherein the rod may be inserted into the first through opening. The second body component may have a pair of tabs each having a second through opening with a second axis extending through the through openings. The tab of the first body component may be received in a space between the pair of tabs such that the first axis and the second axis are coaxial with the longitudinal axis of the rod. The rod may be inserted into the first through opening and the second through openings. The attachment element may have a pair of opposed terminal ends each having a through opening with an attachment element axis extending therethrough. The pair of tabs of the second body component may be received between the opposed terminal ends such that the first axis, the second axis, and the attachment element axis are coaxial with the longitudinal axis of the rod. The rod may be inserted into the first through opening, the second through openings, and the terminal end through openings.

In some non-limiting embodiments or aspects, the first connector and the second connector may be removably connectable to each other via a locking and release mechanism between a first, locked configuration, where the first connector and the second connector are connected to each other, and a second, unlocked configuration, where the first connector and the second connector are disconnected from each other.

In some non-limiting embodiments or aspects, the first connector may have a first portion of a locking and release mechanism, and the second connector may have a second portion of the locking and release mechanism. The first portion of the locking and release mechanism may have: a tab having a first end connected to the body of the first connector and a second, free end protruding away from the body of the first connector, and a first latch at the second end of the tab and protruding laterally outward relative to at least one lateral side of the tab. The second portion of the locking and release mechanism may have: an upper plate and a lower plate defining a slot therebetween and configured for receiving at least a portion of the tab, and a pair of locking arms disposed within at least a portion of the slot and configured for interacting with the tab, the pair of locking arms movable between a first, locked position and a second, unlocked position to allow movement of at least a portion of the tab into and out of the slot. Each of the pair of locking arms may have a locking tooth at a first end and a release tab at a second end with a pivot pin positioned between the locking tooth and the release tab such that each locking arm is pivotally movable about the pivot pin. Each of the pair of locking arms may be biased to the first position by a biasing member.

In some non-limiting embodiments or aspects, the first connector may have a first buckle configured to connect to a first shoulder strap of the wearable body harness, and the second connector may have a second buckle configured to connect to a second shoulder strap of the wearable body harness. The first buckle may have a first bar spaced apart from the first connector by a first pair of posts and the second buckle may have a second bar spaced apart from the second connector by a second pair of posts.

In some non-limiting embodiments or aspects, a wearable body harness may include a plurality of straps comprising: a first shoulder strap and a second shoulder strap; a first connector connected to the first shoulder strap, the first connector comprising a first body component, a second body component, and an attachment element connected to each other by a rod having a longitudinal axis; and a second connector connected to the second shoulder strap and removably connectable to the first connector, wherein each of the first body component, the second body component, and the attachment element of the first connector are independently movable relative to each other about the longitudinal axis of the rod. The first shoulder strap and the second shoulder strap may be arranged in an X-shaped configuration at a front portion of the harness.

Further non-limiting embodiments or aspects are set forth in the following numbered clauses.

Clause 1: A connection arrangement for use with a wearable body harness, the connection arrangement comprising: a first connector comprising a first body component, a second body component, and an attachment element connected to each other by a rod having a longitudinal axis; and a second connector removably connectable to the first connector, wherein each of the first body component, the second body component, and the attachment element are independently movable relative to each other about the longitudinal axis of the rod.

Clause 2. The connection arrangement of clause 1, wherein the first body component has a tab with a first through opening having a first axis that is coaxial with the longitudinal axis of the rod, and wherein the rod is inserted into the first through opening.

Clause 3. The connection arrangement of clause 1 or 2, wherein the second body component has a pair of tabs each having a second through opening with a second axis extending through the through openings, wherein the tab of the first body component is received in a space between the pair of tabs such that the first axis and the second axis are coaxial with the longitudinal axis of the rod, and wherein the rod is inserted into the first through opening and the second through openings.

Clause 4. The connection arrangement of any of clauses 1-3, wherein the attachment element has a pair of opposed terminal ends each having a through opening with an attachment element axis extending therethrough, wherein the pair of tabs of the second body component are received between the opposed terminal ends such that the first axis, the second axis, and the attachment element axis are coaxial with the longitudinal axis of the rod, and wherein the rod is inserted into the first through opening, the second through openings, and the terminal end through openings.

Clause 5. The connection arrangement of any of clauses 1-4, wherein the first connector and the second connector are removably connectable to each other via a locking and release mechanism between a first, locked configuration, where the first connector and the second connector are connected to each other, and a second, unlocked configuration, where the first connector and the second connector are disconnected from each other.

Clause 6. The connection arrangement of any of clauses 1-5, wherein the first connector has a first portion of the locking and release mechanism, and wherein the second connector has a second portion of the locking and release mechanism, wherein the first portion of the locking and release mechanism comprises: a tab having a first end connected to the body of the first connector and a second, free end protruding away from the body of the first connector, and a first latch at the second end of the tab and protruding laterally outward relative to at least one lateral side of the tab, and wherein the second portion of the locking and release mechanism comprises: an upper plate and a lower plate defining a slot therebetween and configured for receiving at least a portion of the tab, and a pair of locking arms disposed within at least a portion of the slot and configured for interacting with the tab, the pair of locking arms movable between a first, locked position and a second, unlocked position to allow movement of at least a portion of the tab into and out of the slot.

Clause 7. The connection arrangement of any of clauses 1-6, wherein each of the pair of locking arms has a locking tooth at a first end and a release tab at a second end with a pivot pin positioned between the locking tooth and the release tab such that each locking arm is pivotally movable about the pivot pin.

Clause 8. The connection arrangement of any of clauses 1-7, wherein each of the pair of locking arms is biased to the first position by a biasing member.

Clause 9. The connection arrangement of any of clauses 1-8, wherein the first connector comprises a first buckle configured to connect to a first shoulder strap of the wearable body harness, and wherein the second connector comprises a second buckle configured to connect to a second shoulder strap of the wearable body harness.

Clause 10. The connection arrangement of any of clauses 1-9, wherein the first buckle comprises a first bar spaced apart from the first connector by a first pair of posts and wherein the second buckle comprises a second bar spaced apart from the second connector by a second pair of posts.

Clause 11. A wearable body harness having a plurality of straps comprising: a first shoulder strap and a second shoulder strap; a first connector connected to the first shoulder strap, the first connector comprising a first body component, a second body component, and an attachment element connected to each other by a rod having a longitudinal axis; and a second connector connected to the second shoulder strap and removably connectable to the first connector, wherein each of the first body component, the second body component, and the attachment element of the first connector are independently movable relative to each other about the longitudinal axis of the rod.

Clause 12. The wearable body harness of clause 11, wherein the first shoulder strap and the second shoulder strap are arranged in an X-shaped configuration at a front portion of the harness.

Clause 13. The wearable body harness of clause 11 or 12, wherein the first body component has a tab with a first through opening having a first axis that is coaxial with the longitudinal axis of the rod, and wherein the rod is inserted into the first through opening.

Clause 14. The wearable body harness of any of clauses 11-13, wherein the second body component has a pair of tabs each having a second through opening with a second axis extending through the through openings, wherein the tab of the first body component is received in a space between the pair of tabs such that the first axis and the second axis are coaxial with the longitudinal axis of the rod, and wherein the rod is inserted into the first through opening and the second through openings.

Clause 15. The wearable body harness of any of clauses 11-14, wherein the attachment element has a pair of opposed terminal ends each having a through opening with an attachment element axis extending therethrough, wherein the pair of tabs of the second body component are received between the opposed terminal ends such that the first axis, the second axis, and the attachment element axis are coaxial with the longitudinal axis of the rod, and wherein the rod is inserted into the first through opening, the second through openings, and the terminal end through openings.

Clause 16. The wearable body harness of any of clauses 11-15, wherein the first connector and the second connector are removably connectable to each other via a locking and release mechanism between a first, locked configuration, where the first connector and the second connector are connected to each other, and a second, unlocked configuration, where the first connector and the second connector are disconnected from each other.

Clause 17. The wearable body harness of any of clauses 11-16, wherein the first connector has a first portion of the locking and release mechanism, and wherein the second connector has a second portion of the locking and release mechanism, wherein the first portion of the locking and release mechanism comprises: a tab having a first end connected to the body of the first connector and a second, free end protruding away from the body of the first connector, and a first latch at the second end of the tab and protruding laterally outward relative to at least one lateral side of the tab, and wherein the second portion of the locking and release mechanism comprises: an upper plate and a lower plate defining a slot therebetween and configured for receiving at least a portion of the tab, and a pair of locking arms disposed within at least a portion of the slot and configured for interacting with the tab, the pair of locking arms movable between a first, locked position and a second, unlocked position to allow movement of at least a portion of the tab into and out of the slot.

Clause 18. The wearable body harness of any of clauses 11-17, wherein each of the pair of locking arms has a locking tooth at a first end and a release tab at a second end with a pivot pin positioned between the locking tooth and the release tab such that each locking arm is pivotally movable about the pivot pin.

Clause 19. The wearable body harness of any of clauses 11-18, wherein each of the pair of locking arms is biased to the first position by a biasing member.

Clause 20. The wearable body harness of any of clauses 11-19, wherein the first connector comprises a first buckle configured to connect to a first shoulder strap of the wearable body harness, and wherein the second connector comprises a second buckle configured to connect to a second shoulder strap of the wearable body harness.

These and other features and characteristics of the present disclosure, as well as the methods of operation and functions of the related elements of structures and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the disclosure.

BRIEF DESCRIPTION OF THE DRAWINGS

In FIGS. 1-5, like characters refer to the same components and elements, as the case may be, unless otherwise stated.

DETAILED DESCRIPTION

Figure 1:
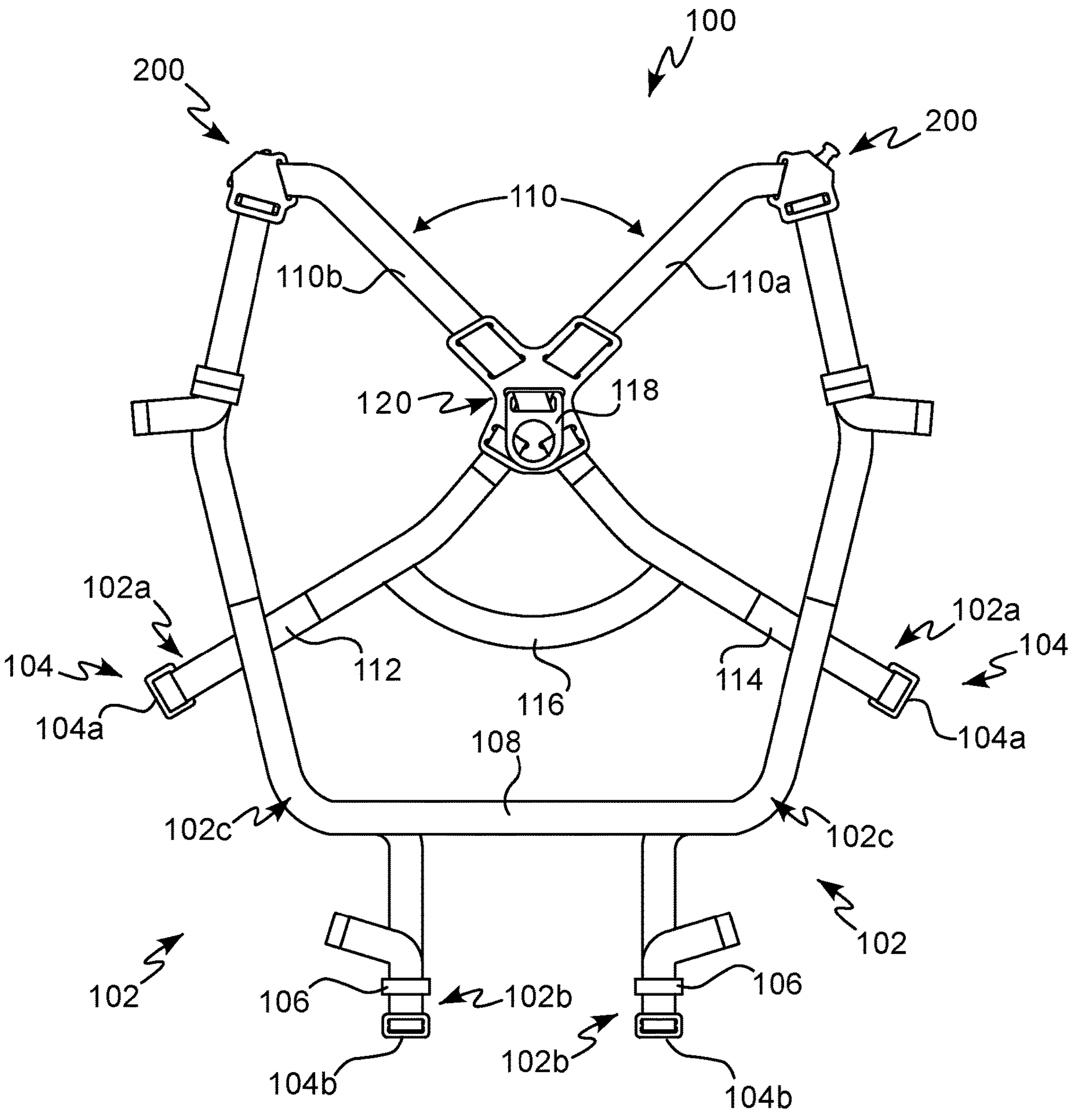
FIG. 1 is a front perspective view of a wearable body harness in accordance with some non-limiting embodiments or aspects of the present disclosure.

As used herein, the singular form of "a", "an", and "the" include plural referents unless the context clearly dictates otherwise.

Spatial or directional terms, such as "left", "right", "inner", "outer", "above", "below", and the like, relate to the disclosure as shown in the drawing figures and are not to be considered as limiting as the disclosure can assume various alternative orientations.

All numbers and ranges used in the specification and claims are to be understood as being modified in all instances by the term "about". By "about" is meant plus or minus twenty-five percent of the stated value, such as plus or minus ten percent of the stated value. However, this should not be considered as limiting to any analysis of the values under the doctrine of equivalents.

Unless otherwise indicated, all ranges or ratios disclosed herein are to be understood to encompass the beginning and ending values and any and all subranges or subratios subsumed therein. For example, a stated range or ratio of "1 to 10" should be considered to include any and all subranges or subratios between (and inclusive of) the minimum value of 1 and the maximum value of 10; that is, all subranges or subratios beginning with a minimum value of 1 or more and ending with a maximum value of 10 or less. The ranges and/or ratios disclosed herein represent the average values over the specified range and/or ratio.

The terms "first", "second", and the like are not intended to refer to any particular order or chronology, but refer to different conditions, properties, or elements.

The term "at least" is synonymous with "greater than or equal to".

The term "not greater than" is synonymous with "less than or equal to".

As used herein, "at least one of" is synonymous with "one or more of". For example, the phrase "at least one of A, B, and C" means any one of A, B, or C, or any combination of any two or more of A, B, or C. For example, "at least one of A, B, and C" includes A alone; or B alone; or C alone; or A and B; or A and C; or B and C; or all of A, B, and C.

The term "includes" is synonymous with "comprises".

As used herein, the terms "parallel" or "substantially parallel" mean a relative angle as between two objects (if extended to theoretical intersection), such as elongated objects and including reference lines, that is from 0° to 5°, or from 0° to 3°, or from 0° to 2°, or from 0° to 1°, or from 0° to 0.5°, or from 0° to 0.25°, or from 0° to 0.1°, inclusive of the recited values.

As used herein, the terms "perpendicular" or "substantially perpendicular" mean a relative angle as between two objects at their real or theoretical intersection is from 85° to 90°, or from 87° to 90°, or from 88° to 90°, or from 89° to 90°, or from 89.5° to 90°, or from 89.75° to 90°, or from 89.9° to 90°, inclusive of the recited values.

The discussion of the disclosure may describe certain features as being "particularly" or "preferably" within certain limitations (e.g., "preferably", "more preferably", or "even more preferably", within certain limitations). It is to be understood that the disclosure is not limited to these particular or preferred limitations but encompasses the entire scope of the disclosure.

In various non-limiting embodiments or aspects, and with reference to FIG. 1, the present disclosure is directed to a wearable safety harness 100 (hereinafter referred to as "harness 100") used in a fall protection system. As discussed herein, the harness 100 has a harness connection arrangement configured for releasably coupling at least a pair of straps of the harness 100. Preferably, the harness 100 has a harness connection arrangement for connecting at least two straps of the harness, wherein the harness connection arrangement can be easily and effectively connected and disconnected to allow quick donning and removal of the harness 100.

With continued reference to FIG. 1, the harness 100 has at least two leg straps 102 configured to attach around a user's legs below a user's groin area. When attached, the leg straps 102 loop around or encircle each of the user's legs. Each leg strap 102 has a first end 102*a* that is removably attachable to a second end 102*b* via a connector 104. In some non-limiting embodiments or aspects, the connector 104 may be a clip, a buckle, a mating arrangement, an actuatable structure, or the like. The connector 104 permits removable attachment of the first end 102*a* to the second end 102*b* of each leg strap 102. In this manner, the first and second ends 102*a*, 102*b* of the leg straps 102 are configured to be removably attached to each other and configured to be free floating when detached from each other. In some non-limiting embodiments or aspects, at least one connector 104 and/or the leg strap 102 may have at least one connection mechanism 106 configured for adjusting the length of each leg strap 102. In this manner, the at least one connection mechanism 106 adjusts a distance between the first end 102*a* and the second end 102*b* such that each leg strap 102 may be adjusted to fit comfortably around the user's legs. Each leg strap 102 may be formed from a substantially flat webbing material typically used in harness construction. One or more handles, clips, and/or connectors (not shown) may be provided on at least a portion of the harness 100. The harness 100 may include padding (not shown) for increasing the user's comfort while wearing the harness 100.

In various non-limiting embodiments or aspects, the leg straps 102 (or, indeed, any of the straps in the harness 100) may be linear lengths of material, folded straps that form loops with the at least one connector 104 at the first end 102*a* and/or the second end 102*b*, or the like. For example, as shown in FIG. 1, the connector 104 may have a first portion 104*a* that is non-adjustably attached to the first end 102*a* of at least one leg strap 102, while a second portion 104*b* of the connector 104 is adjustably secured at the second end 102*b* of at least one leg strap 102 through a loop of the material that makes up the leg strap 102. Therefore, in such an arrangement, the first portion 104*a* of the connector 104 and the loop of material that makes up the leg strap 102 at the second end 102*b* defines the at least one connection mechanism 106 for adjusting a length of the leg strap 102. It should be noted that the position of the connection mechanism 106 may be reversed such that the adjustable second portion 104*b* of the connector 104 is provided on the first end 102*a* of the leg strap 102. At least one leg strap 102 may include padding (not shown) for increasing the user's comfort while wearing the harness 100.

With continued reference to FIG. 1, each leg strap 102 is connected to a seat strap 108 at a substantially intermediate portion 102*c* of the leg strap 102 between the first end 102*a* and the second end 102*b*. In some non-limiting embodiments or aspects, the substantially intermediate portion 102*c* of the leg strap 102 may be directly and non-movably connected to a seat strap 108, such as being sewn directly to the seat strap 108. The seat strap 108 may be formed from a substantially flat webbing material typically used in harness construction. In other non-limiting embodiments or aspects, the substantially intermediate portion 102*c* of each leg strap 102 may be connected to the rear end of the seat strap 108 by a connection strap (not shown) to allow the substantially intermediate portion 102*c* of the leg strap 102 to slidably move along a front portion of the leg strap 102. Accordingly, the position of the leg straps 102 may be adjusted relative to the seat strap 108 to increase the user's comfort while wearing the harness 100.

With continued reference to FIG. 1, the harness 100 further has the shoulder strap 110 configured to extend over at least a portion of the user's shoulders. The shoulder strap 110 may have a first shoulder strap 110*a* and a second shoulder strap 110*b* arranged to overlap one another in an X-shaped configuration, with the shoulder straps 110*a*, 110*b* configured to be connected together at the user's chest area. As described herein, the first and second shoulder straps 110*a*, 110*b* may be releasably connected together by a connection arrangement. In some non-limiting embodiments or aspects, the shoulder strap 110 may have at least one shoulder pad 120 having one or more openings through which the first shoulder strap 110*a* and the second shoulder strap 110*b* can be arranged to maintain the first shoulder strap 110*a* and the second shoulder strap 110*b* in the X-shaped configuration.

As further shown in FIG. 1, the first shoulder strap 110*a* has a first end 112 that is connected to the first end 102*a* of a first leg strap 102. The first end 112 of the first shoulder strap 110*a* may be removably or non-removably attachable to the first end 102*a* of a first leg strap 102. In some non-limiting embodiments or aspects, the first end 112 of the first shoulder strap 110*a* may be attached to the first end 102*a* of a first leg strap 102 via a connector similar to the connector 104 described herein with reference to the leg straps 102. At least a portion of the first shoulder strap 110*a* may be formed from a substantially flat webbing material typically used in harness construction.

With continued reference to FIG. 1, the second shoulder strap 110*b* has a first end 114 that is connected to the first end 102*a* of the second leg strap 102. The first end 114 of the second shoulder strap 110*b* may be removably or non-removably attachable to the first end 102*a* of the second leg strap 102. In some embodiments or aspects, the first end 114 of the second shoulder strap 110*b* may be attached to the first end 102*a* of the second leg strap 102 via a connector similar to the connector 104 described herein with reference to the leg straps 102. At least a portion of the second shoulder strap 110*b* may be formed from a substantially flat webbing material typically used in harness construction.

As further shown in FIG. 1, the harness 100 may have a back strap 116 connecting a substantially intermediate portion of the first shoulder strap 110*a* with a substantially intermediate portion of the second shoulder strap 110*b*. In some non-limiting embodiments or aspects, a position of the back strap 116 may be fixed relative to the shoulder straps 110*a*, 110*b*. In other non-limiting embodiments or aspects, a position of the back strap 116 may be adjustable along a longitudinal direction of the first shoulder strap 110*a* and the second shoulder strap 110*b*, such as by sliding the back strap 116 along the first shoulder strap 110*a* and/or the second shoulder strap 110*b*. The back strap 116 may be formed from a substantially flat webbing material typically used in harness construction.

With continued reference to FIG. 1, the first and second shoulder straps 110*a*, 110*b* may be connectable together at a front portion of the harness 100 in an area of the user's chest. In some non-limiting embodiments or aspects, the first and second shoulder straps 110*a*, 110*b* may have at least one connection arrangement 200 further described herein with reference to FIGS. 2A-5 for releasably connecting the first and second shoulder straps 110*a*, 110*b* to each other.

As further shown in FIG. 1, the shoulder strap 110 has a rear attachment element 118, such as a D-ring, for connecting at least a portion of the shoulder strap 110 to a line connected to an anchor point. In some non-limiting embodiments or aspects, at least a portion of the first shoulder strap 110*a* and the second shoulder strap 110*b* is looped around or otherwise permanently attached to the rear attachment element 118. The rear attachment element 118 has a frame defining at least one opening through which the first shoulder strap 110*a* and the second shoulder strap 110*b* may be looped around and through which a clip, such as a carabiner, a lanyard, or other rope or line, can be secured to connect the harness 100 to an anchor point.

Figure 2A:
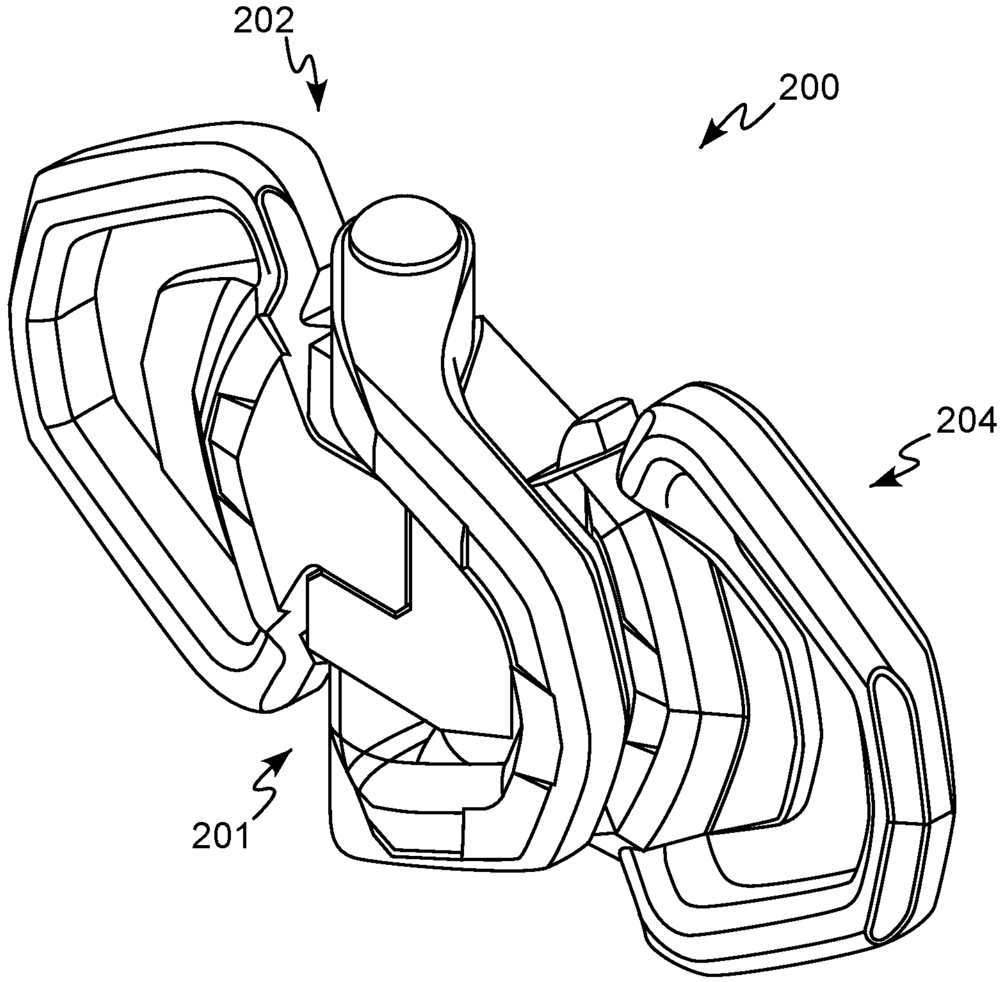
FIG. 2A is a front perspective view of a harness connection arrangement for use with a wearable body harness in accordance with some non-limiting embodiments or aspects of the present disclosure showing a first connector and a second connector connected to each other.
Figure 2B:
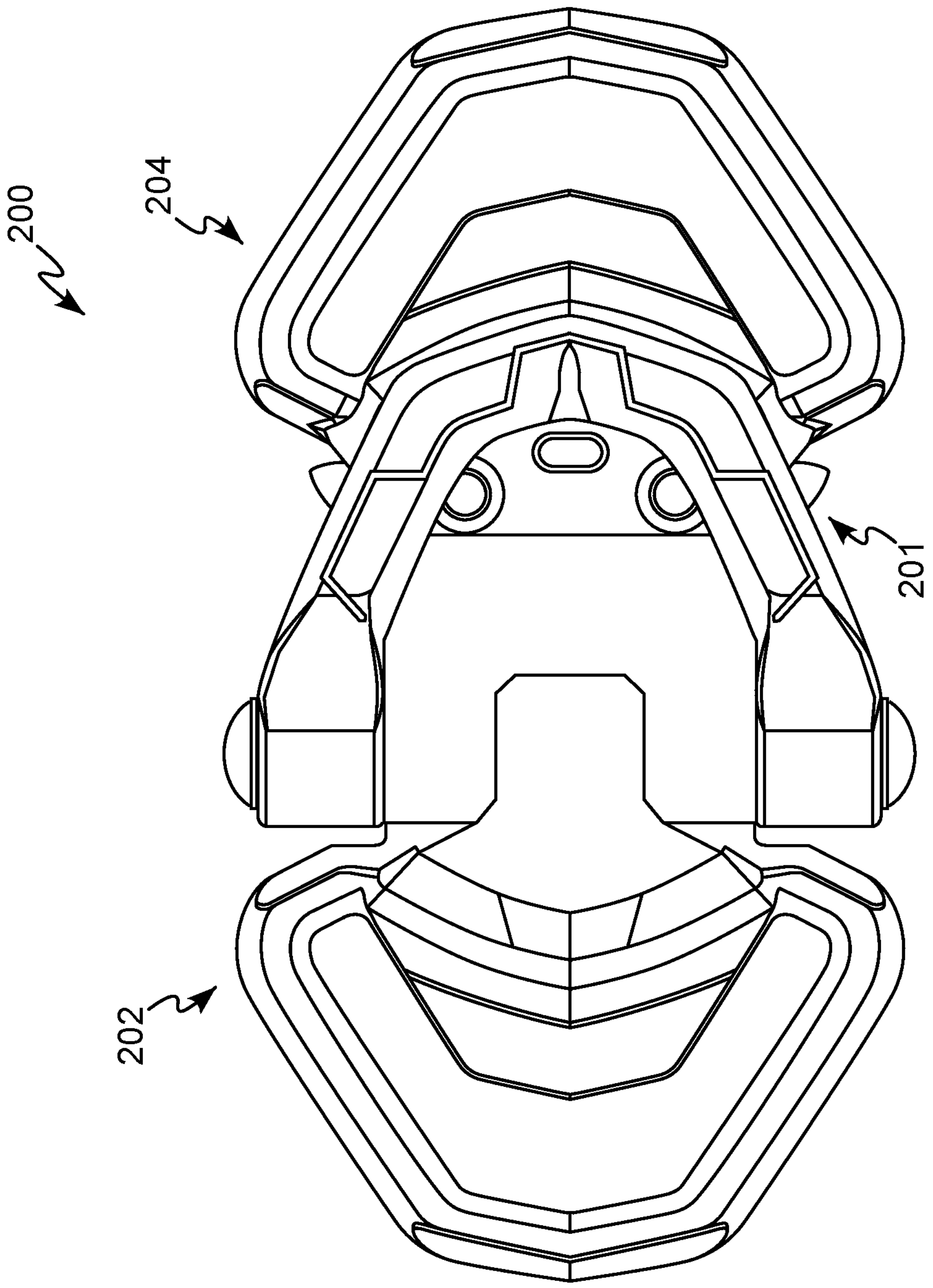
FIG. 2B is a front view of the harness connection arrangement of FIG. 2A.
Figure 2C:
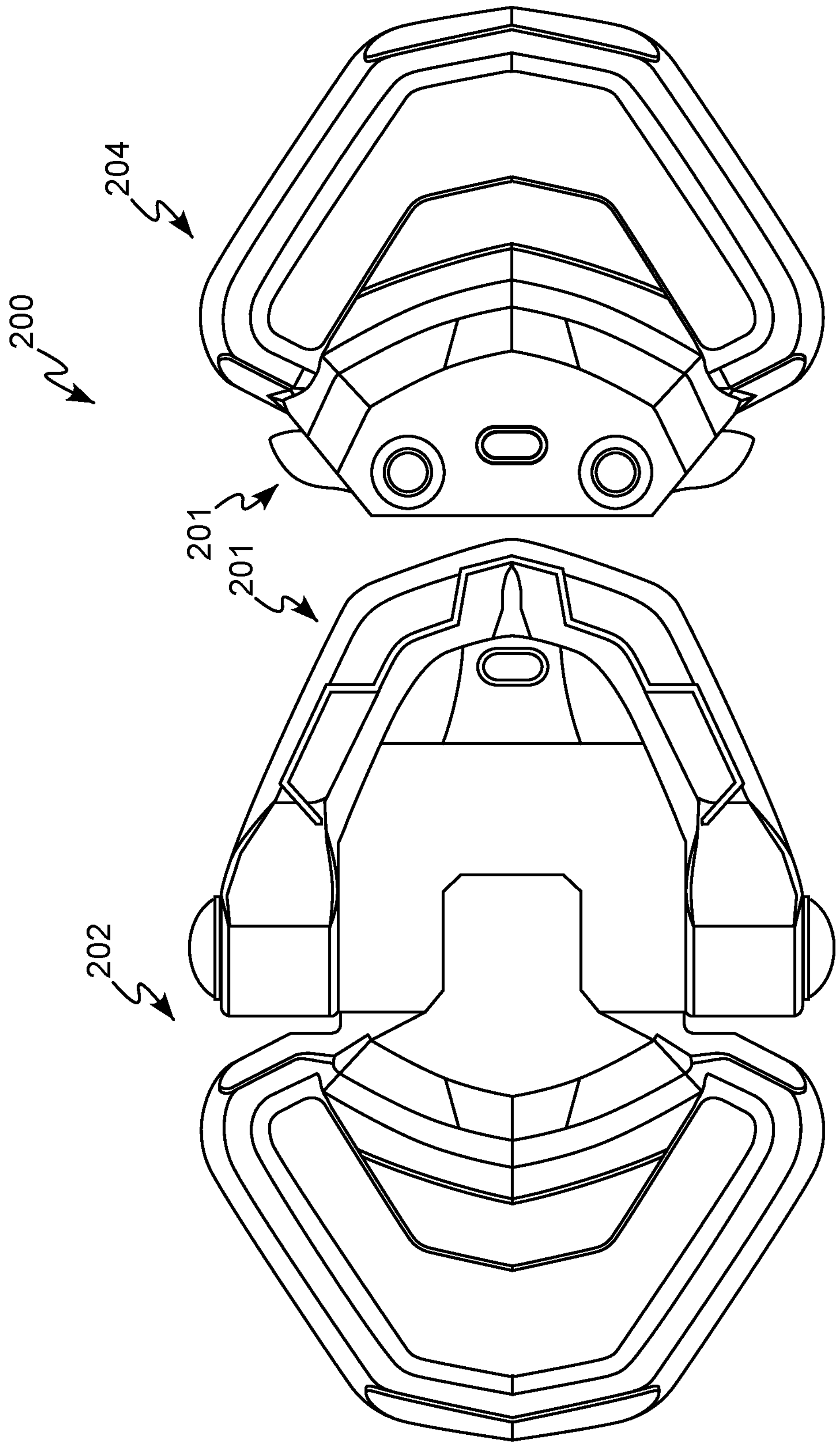
FIG. 2C is a front view of the harness connection arrangement of FIG. 2A showing the first connector and the second connector disconnected from each other.

With reference to FIGS. 2A-2C, the harness connection arrangement 200 (hereinafter referred to as "connection arrangement 200") for use with a wearable body harness, such as the harness 100 shown in FIG. 1, is shown in accordance with some non-limiting embodiments or aspects of the present disclosure. The connection arrangement 200 is illustrated without harness straps for clarity. While in some non-limiting embodiments or aspects of the present disclosure the connection arrangement 200 is configured for connecting portions of the shoulder strap 110, such as the first shoulder strap and the second shoulder strap 110*a*, 110*b*, across the user's chest, the connection arrangement 200 can be used to connect any two or more straps of the harness 100 shown in FIG. 1.

With continued reference to FIGS. 2A-2C, the connection arrangement 200 has a first connector 202 removably connectable to a second connector 204. The first connector 202 and the second connector 204 have a locking and release mechanism 201 for locking the two connectors 202, 204 together and for releasing the first connector 202 from the second connector 204. As described herein, the first and second connectors 202, 204 are engageable between a first, locked state or configuration (FIGS. 2A-2B), where the first and second connectors 202, 204 are connected to each other, and a second, unlocked state or configuration (FIG. 2C), where the first and second connectors 202, 204 are disconnected from each other. The first and second connectors 202, 204 can be connected to each another and disconnected from each other by appropriate actuation of the locking and release mechanism 201, as discussed herein. In various non-limiting embodiments or aspects, various components of the connection arrangement 200 may be made from metal, plastic, a composite material, and any combination thereof.

Figure 3A:
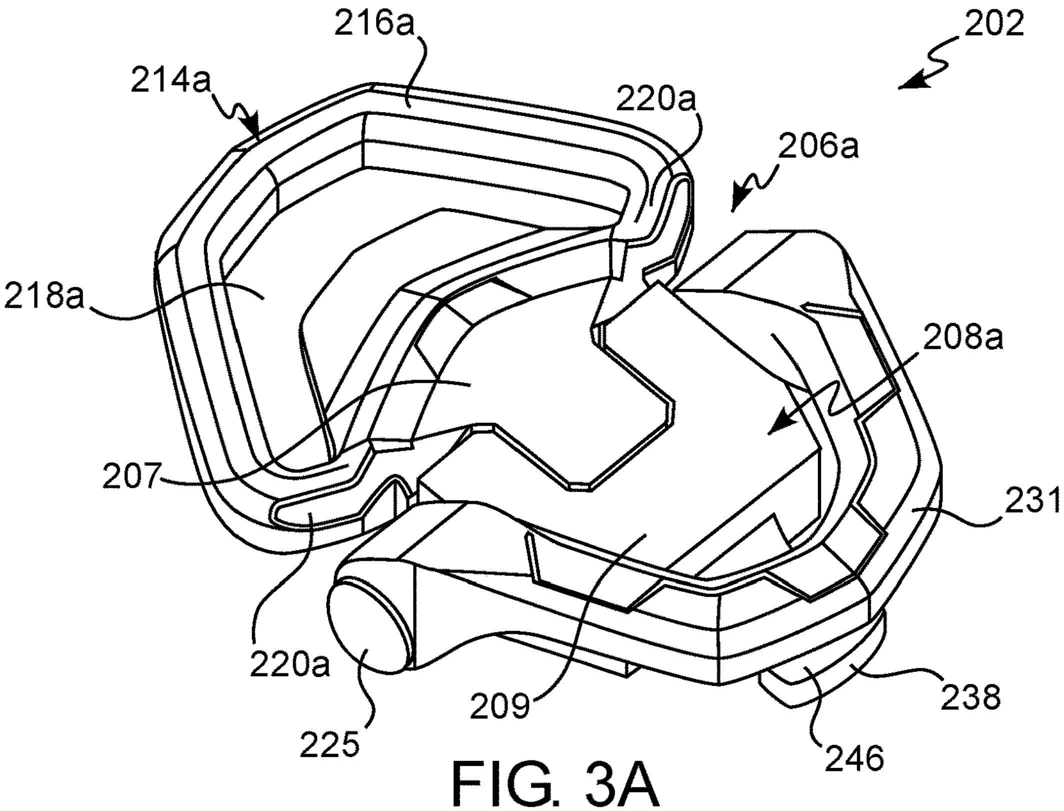
FIG. 3A is a front perspective view of a first connector of the harness connection arrangement of FIGS. 2A-2C.
Figure 3B:
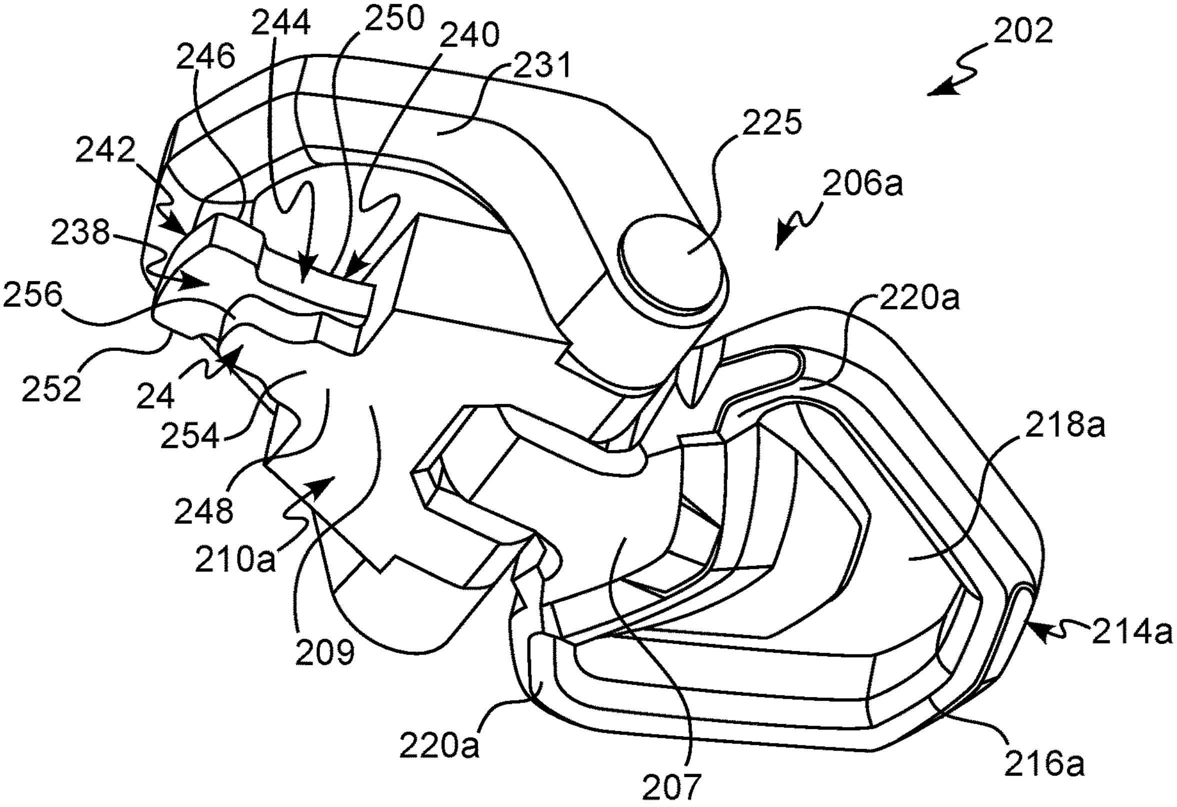
FIG. 3B is a rear perspective view of the first connector shown in FIG. 3A.

With reference to FIGS. 3A-3B, the first connector 202 is shown separate from the second connector 204 of the connection arrangement 200. The first connector 202 has a first body 206*a* with a first side 208*a* opposite a second side 210*a* (shown in FIG. 3B). In some non-limiting embodiments or aspects, the first side 208*a* may face away from a body of the user while a second side 210*a* may face toward a body of the user when the first connector 202 is installed on a harness 100 worn by the user (shown in FIG. 1). While FIGS. 3A-3B show the first body 206*a* of the first connector 202 as being substantially planar, the first body 206*a* may have a non-planar shape in other non-limiting embodiments or aspects. The first body 206*a* may be monolithically formed as a single, integral piece. In other non-limiting embodiments or aspects, the first body 206*a* of the first connector 202 may be formed from two or more components that are removably or non-removably connected together. In various non-limiting embodiments or aspects, the first body 206*a* of the first connector 202 may be made from metal, plastic, a composite material, and any combination thereof.

Figure 3C:
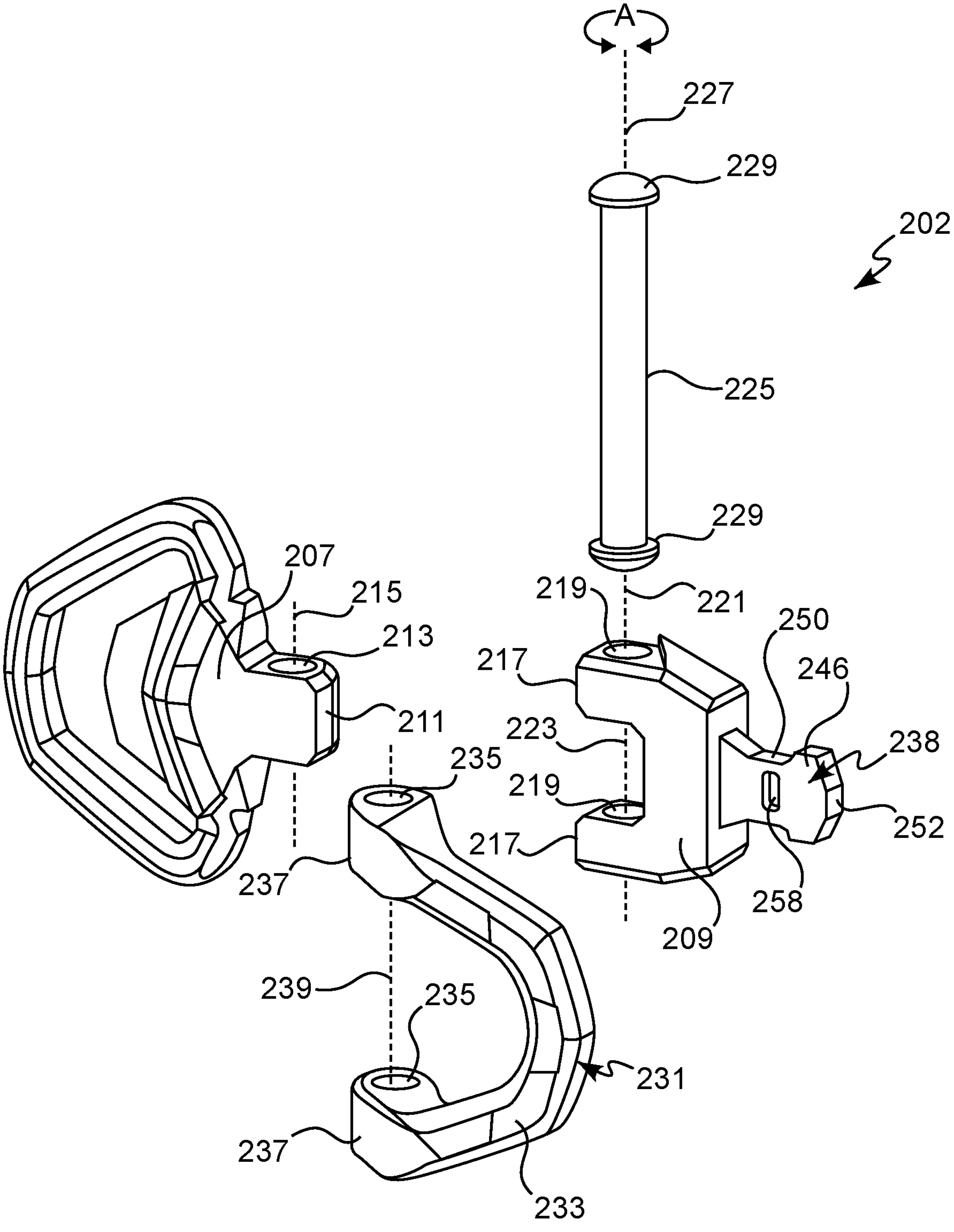
FIG. 3C is an exploded perspective view of the first connector shown in FIG. 3A.

With continued reference to FIGS. 3A-3B, the first body 206*a* of the first connector 202 has a first body component 207 and a second body component 209 that is connected to the first body component 207 in an articulating manner, as described herein. With reference to FIG. 3C, the first body component 207 has a tongue 211 having first through hole 213 with a first axis 215 extending through the first through hole 213. The second body component 209 has a pair of spaced apart tabs 217, with each tab 217 having a second through hole 219 with a second axis 221 extending through the second through holes 219. The tabs 217 are spaced apart such that the tongue 211 of the first body component 207 can be received within a space 223 defined between the tabs 217.

With continued reference to FIG. 3C, the first body component 207 is connected to the second body component 209 by a rod 225 that is shaped as an elongated member having a longitudinal axis 227. The rod 225 is sized to be received within the first through hole 213 of the first body component 207 and the second through holes 219 of the second body component 209. When the first body component 207 is connected to the second body component 209, the first axis 215 of the first through hole 213 and the second axis 221 of the second through holes 219 are coaxial with the longitudinal axis 227 of the rod 225. The rod 225 may have caps 229 at its terminal ends to prevent movement or removal of the rod from the first through hole 213 and the second through holes 219. The first body component 207 can articulate relative to the second body component 209 about the longitudinal axis 227 of the rod 225 in a direction of arrows A shown in FIG. 3C. Such articulating motion of the first body component 207 relative to the second body component 209 allows additional movement of the straps of the harness 100 (shown in FIG. 1) to accommodate for movement of the user while wearing the harness 100. The harness 100 equipped with the articulating harness connection arrangement 200 is thus more comfortable to wear because the first connector 202 can articulate relative to the second connector 204 to prevent either connector from "digging" into the user's chest.

With continued reference to FIGS. 3A-3C, the first connector 202 has an integrated attachment element 231, such as a D-ring, for connecting harness 100 to a line connected to an anchor point. The attachment element 231 serves as a single, centrally located attachment point for securing the harness 100 to a line using, for example, a connector that is configured for connecting to the attachment element 231. In some non-limiting embodiments or aspects, the attachment element 231 has a U-shaped frame 233 with through holes 235 extending through each of the two terminal ends 237. The frame 233 is configured for engagement by the connector. The through holes 235 are arranged such that they have a common axis 239 (shown in FIG. 3C). The terminal ends 237 of the attachment element 231 are spaced apart such that at least a portion of the second body component 209, such as the tabs 217, can be inserted therebetween. The rod 225 can be inserted into the first through hole 213 of the first body component 207, the second through holes 219 of the second body component 209, and the through holes 235 of the terminal ends 237 of the attachment element 231. In this manner, the first axis 215 of the first through hole 213, the second axis 221 of the second through holes 219, and the axis 239 of the attachment element 231 are coaxial with the longitudinal axis 227 of the rod 225. Thus, the first body component 207, the second body component 209, and the attachment element 231 can each articulate about the longitudinal axis 227 of the rod 225 in a direction of arrows A shown in FIG. 3C.

Figure 3D:
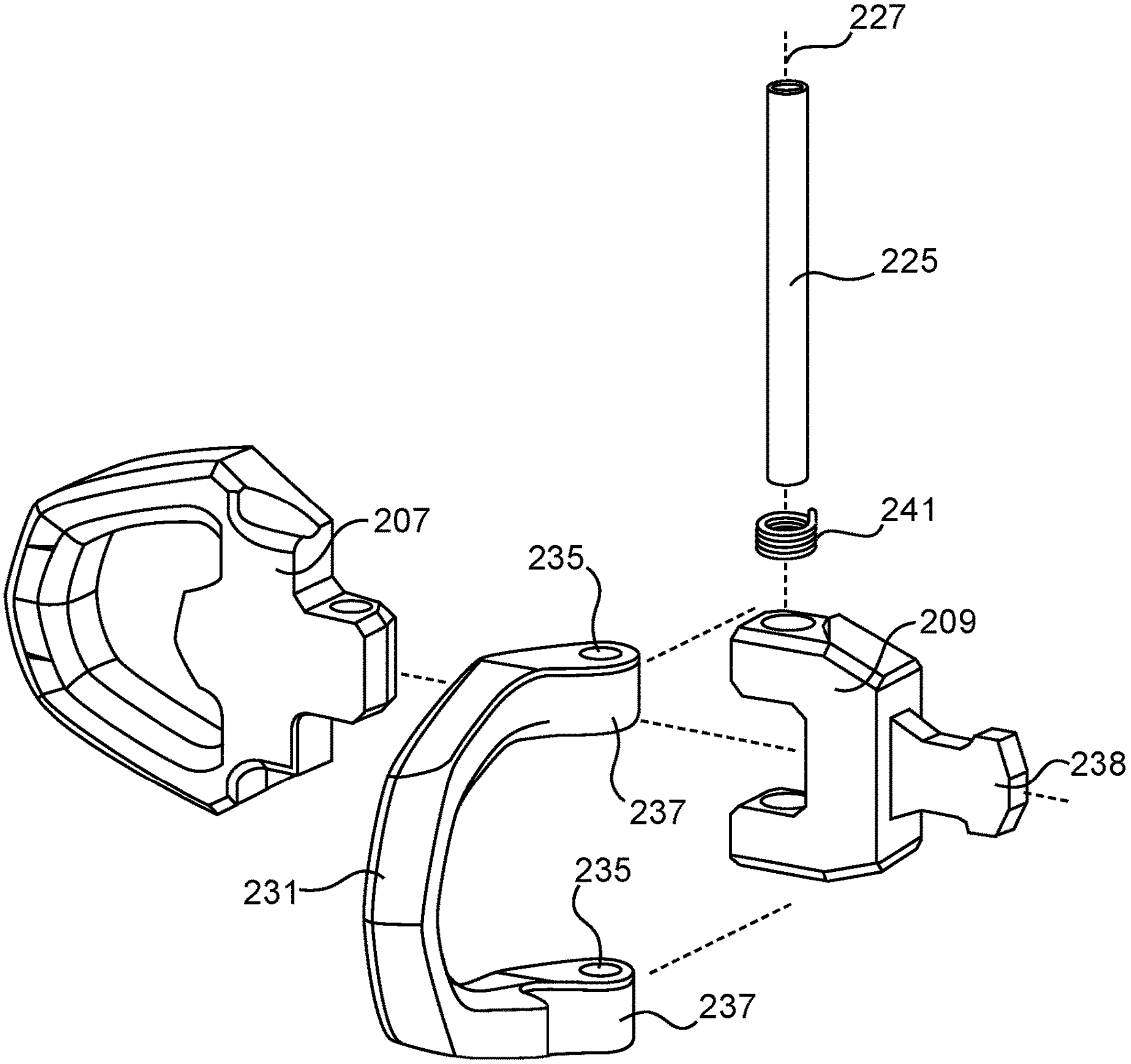
FIG. 3D is an exploded perspective view of a first connector in accordance with other non-limiting embodiments or aspects of the present disclosure.

In some non-limiting embodiments or aspects, such as shown in FIG. 3D, the attachment element 231 may be biased to assume a specific position via at least one attachment element biasing member 241. For example, the attachment element 231 may be biased to a closed position, wherein the frame 233 is urged close to the first connector 202, or to an open position, wherein the frame 233 is urged away from the first connector 202. In some non-limiting embodiments or aspects, the at least one biasing member 241 may be at least one torsion spring that is positioned within the through hole 235 of at least one terminal end 237 of the attachment element 231 between an outer surface of the rod 225 and an inner surface of the through hole 235. In this manner, rotation of the attachment element 231 about the longitudinal axis 227 of the rod 225 biases the at least one biasing member 241 from an unbiased position, such as an open position or a closed position, to a biased position, such as a closed position or an open position, respectively. In the unbiased position, the at least one biasing member 241 provides a restoring force to move the attachment element 231 toward the biased position. By biasing the attachment element 231 toward the closed position, potential for snagging the attachment element 231 on objects in the user's vicinity is reduced.

With continued reference to FIGS. 3A-3B, the first connector 202 has at least one first buckle 214*a*. The first buckle 214*a* may be connected to, for example, the first body component 207. The first buckle 214*a* is configured for receiving at least a portion of a harness webbing therethrough, such as at least a portion of the shoulder harness 110. In some non-limiting embodiments or aspects, the first buckle 214*a* is configured to connect to two separate ends of the first shoulder strap 110*a*. The first buckle 214*a* may have a bar 216*a* that is spaced apart from the first body component 207 of the first connector 202 such that the harness webbing may be inserted through a gap 218*a* formed between the bar 216*a* and the first body component 207. The bar 216*a* is connected to the first body component 207 by posts 220*a*. The webbing is desirably looped through the gap 218*a* and around the bar 216*a* such that the webbing overlaps itself around the bar 216*a*. The overlapping ends of the webbing may be sewn together or otherwise attached to prevent removal of the webbing from the first buckle 214*a*. In some non-limiting embodiments or aspects, the first buckle 214*a* may be configured to allow free movement of the straps of the harness 100 to reduce shear forces on the straps when the straps are under load, such as during a fall event.

In some non-limiting embodiments or aspects, the at least one first buckle 214*a* may be provided on at least one of an upper side and a lower side of the first connector 202 when the harness 100 (shown in FIG. 1) is worn by a user. In this manner, one or more straps may be connected to the at least one first buckle 214*a* from above or below the first connector 202. In FIGS. 3A-3B, the at least one first buckle 214*a* is provided on an upper side and a lower side of the first connector 202 when the harness 100 is worn by the user.

With continued reference to FIGS. 3A-3B, the first connector 202 has a first portion of a locking and release mechanism 201 (shown in FIGS. 2A-2E) configured for engaging the first connector 202 between the first, locked configuration, where the first connector 202 is connected to the second connector 204 (shown in FIGS. 2A-2C) and a second, unlocked configuration, where the first connector 202 is disconnected from the second connector 204 (FIGS. 2D-2E). The second body component 209 of the first connector 202 has a tab 238. In some non-limiting embodiments or aspects, the tab 238 is substantially parallel and/or coplanar with a plane defined by the second body component 209. In other non-limiting embodiments or aspects, the tab 238 may be offset relative to a plane defined by the second body component 209. The tab 238 may be monolithically formed with the second body component 209 of the first connector 202, or may be removably or non-removably attached to the second body component 209.

With reference to FIG. 3B, the tab 238 has a first end 240 connected to the second body component 209 and a second, free end 242 protruding away from the second body component 209, with a frame 244 of the tab 238 extending between the first end 240 and the second end 242. The frame 244 has a first or upper side 246 (shown in FIG. 3A) opposite a second or lower side 248 (shown in FIG. 3B). A thickness of the first or upper side 246, such as a thickness in a direction substantially perpendicular to the plane defined by the first body 206*a* of the first connector 202, may be the same or different than a thickness of the second or lower side 248 of the tab 238. In some non-limiting embodiments or aspects, the first or upper side 246 of the frame 244 may have a same shape as the second or lower side 248. In other non-limiting embodiments or aspects, the first or upper side 246 of the frame 244 may have a different shape than the second or lower side 248. For example, with reference to FIG. 3B, the first or upper side 246 may have a first base 250 having a substantially uniform width between the first end 240 and the second end 242, with a first latch 252 connected to the first base 250 at the second end 242. The first latch 252 is configured to interact with the locking teeth of the locking and release mechanism on the second connector 204, as described herein. A width of the first latch 252 is wider than a width of the base 250 such that the latch 252 protrudes laterally outward relative to one or both lateral sides of the base 250. An indicator 258 (shown in FIG. 3C) may be at least partially recessed into the first or upper side 246 of the frame 244 at the base 250 and/or the latch 252.

With reference to FIG. 3B, the second or lower side 248 may have a second tab 24 having a second base 254 having a width that narrows in a direction from the first end 240 toward the second end 242. A second latch 256 may be connected to the second base 254 at the second end 242. A width of the second latch 256 is narrower than a width of the first base 250 and the second base 254.

Figure 4A:
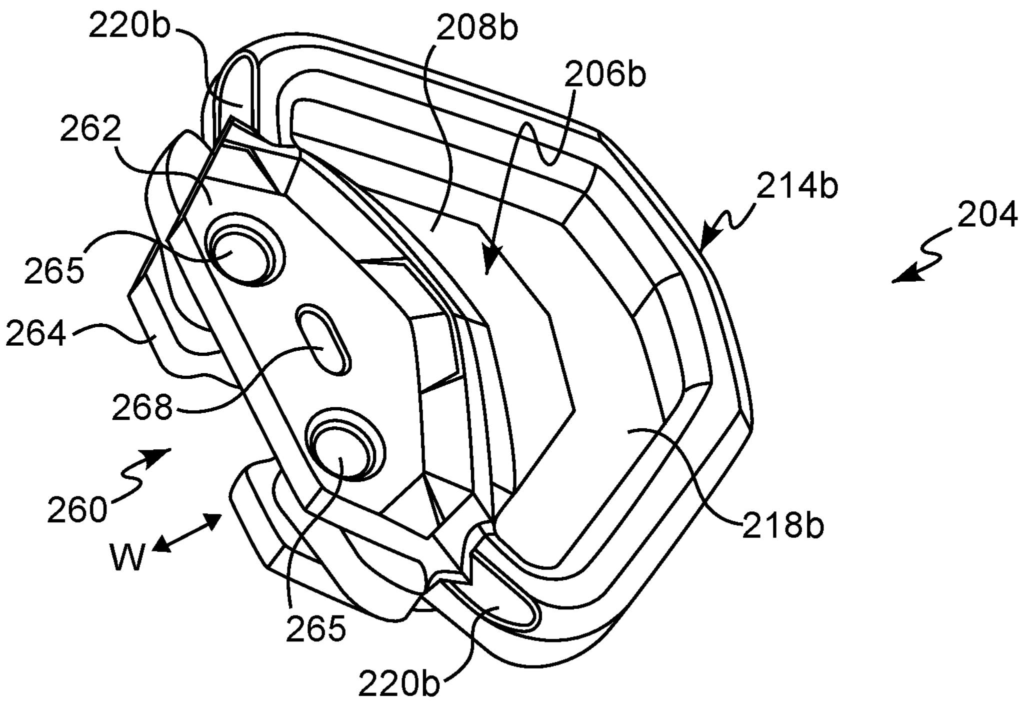
FIG. 4A is a front perspective view of a second connector of the harness connection arrangement of FIGS. 2A-2C.
Figure 4B:
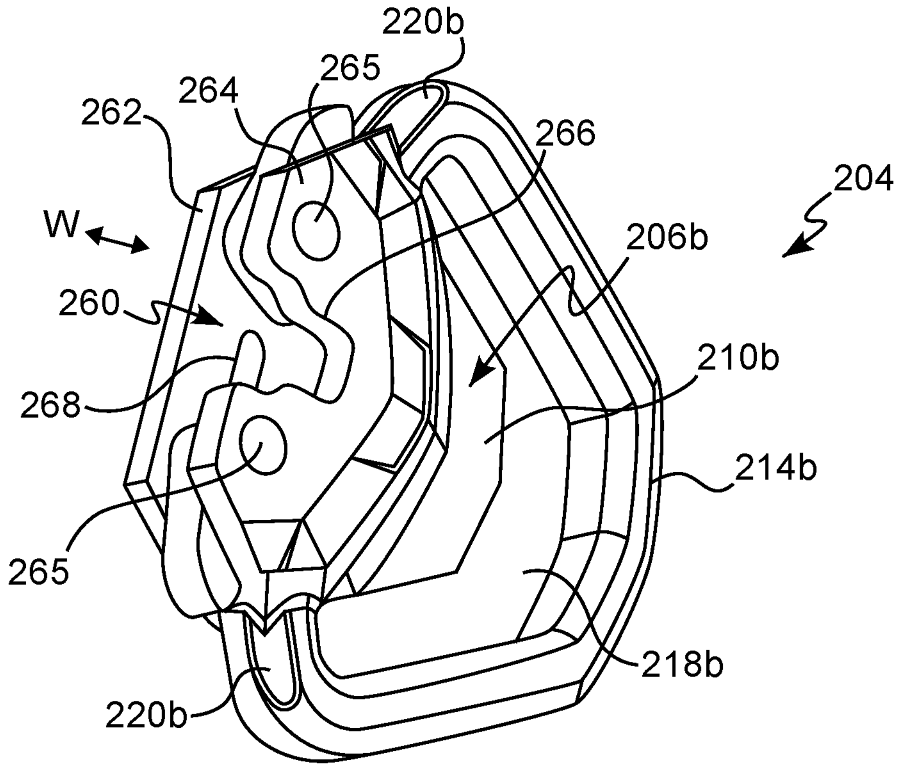
FIG. 4B is a rear perspective view of the second connector shown in FIG. 4A.

With reference to FIGS. 4A-4B, the second connector 204 is shown separate from the first connector 202 of the connection arrangement 200 shown in FIGS. 2A-2E. Components of the second connector 204 shown in FIGS. 4A-4B are substantially similar or identical to the components of the first connector 202 described herein with reference to FIGS. 3A-3C. Reference numerals in FIGS. 4A-4B are used to illustrate identical components of the corresponding reference numerals in FIGS. 3A-3C, with the exception of an identifier "a" being replaced with an identifier "b". For example, whereas the first buckle of the first connector 202 is identified with reference numeral 214*a*, the second buckle of the second connector 204 is identified with reference numeral 214*b*. As the previous discussion regarding the first connector 202 generally shown in FIGS. 3A-3C is applicable to the second connector 204 shown in FIGS. 4A-4B, only the relative differences between the first and second connectors 202, 204 are discussed hereinafter.

With continued reference to FIGS. 4A-4B, the second connector 204 has a second body 206*b* with a first side 208*b* opposite a second side 210*b*. In some non-limiting embodiments or aspects, the first side 208*b* may face away from a body of the user while a second side 210*b* may face toward a body of the user when the second connector 204 is installed on a harness worn by the user. While FIGS. 4A-4B show the second body 206*b* of the second connector 204 being substantially planar, the second body 206*b* may have a non-planar shape. In some non-limiting embodiments or aspects, the second body 206*b* may have a shape that corresponds to the shape of the first body 206*a* of the first connector 202. For example, the second body 206*b* of the second connector 204 may be a mirror image of the first body 206*a* of the first connector 202.

With continued reference to FIGS. 4A-4B, the second connector 204 has at least one second buckle 214*b* connected to the second body 206*b*. The at least one second buckle 214*b* may be substantially identical to the at least one first buckle 214*a* on the first connector 202. Accordingly, a detailed description of the at least one second buckle 214*b* will be omitted for brevity. The second buckle 214*b* is configured for receiving at least a portion of a harness webbing therethrough, such as at least a portion of the shoulder strap 110.

With continued reference to FIGS. 4A-4B, the second connector 204 has a second portion of the locking and release mechanism 201 (shown in FIGS. 2A-2B) configured for engaging with the first portion of the locking and release mechanism 201 on the first connector 202 between the first, locked configuration, where the first connector 202 is connected to the second connector 204 (shown in FIGS. 2A-2C) and a second, unlocked configuration, where the first connector 202 is disconnected from the second connector 204 (shown in FIGS. 2D-2E).

In some non-limiting embodiments or aspects, the second connector 204 has a slot 260 configured for removably receiving the tab 238 of the first connector 202. In some non-limiting embodiments or aspects, the slot 260 is defined by a space between an upper plate 262 and a lower plate 264. In some non-limiting embodiments or aspects, the upper plate 262 and the lower plate 264 may be connected together by one or more pins 265. A width W of the slot 260 in a direction substantially perpendicular to a plane defined by the second body 206*b* of the second connector 204 may be the same or larger than a width of the first or upper side 246 of the tab 238 of the first connector 202 (shown in FIGS. 3A-3B), and smaller than an overall width of the tab 238 of the first connector 202. In some non-limiting embodiments or aspects, and with reference to FIG. 4B, at least one of the upper plate 262 and the lower plate 264, such as the lower plate 264, may have a recess 266 having a shape that corresponds to the shape of at least a portion of the tab 238, such as the second or lower side 248 of the tab 238. In some non-limiting embodiments or aspects, the recess 266 is configured to receive at least a portion of the tab 238, such as the second or lower side 248 of the tab 238, when the tab 238 is inserted into the slot 260, such as during a locking connection of the first connector 202 with the second connector 204. In this manner, the first connector 202 and the second connector 204 can only be connected in one orientation, such as when the second or lower side 248 of the tab 238 is received within the recess 266.

With continued reference to FIGS. 4A-4B, at least one of the upper plate 262 and the lower plate 264, such as the upper plate 262, may have an opening 268 extending through the plate and into the slot 260. The opening 268 may be positioned on the upper plate 262 such that, when the tab 238 of the first connector 202 is fully inserted into the slot 260, the indicator 258 on the first or upper side 246 of the tab 238 is visible through the opening 268 (shown in FIG. 6A). In some non-limiting embodiments or aspects, the indicator 258 may be colored a conspicuous color, such as bright green, such that the indicator 258 is clearly visible through the opening 268 when the first and second connectors 202, 204 are locked together. Visibility of the indicator 258 through the opening 268 may provide an indication that the first and second connectors 202, 204 are locked together and cannot be disconnected without unlocking the locking and release mechanism 201, as described herein.

Figure 4C:
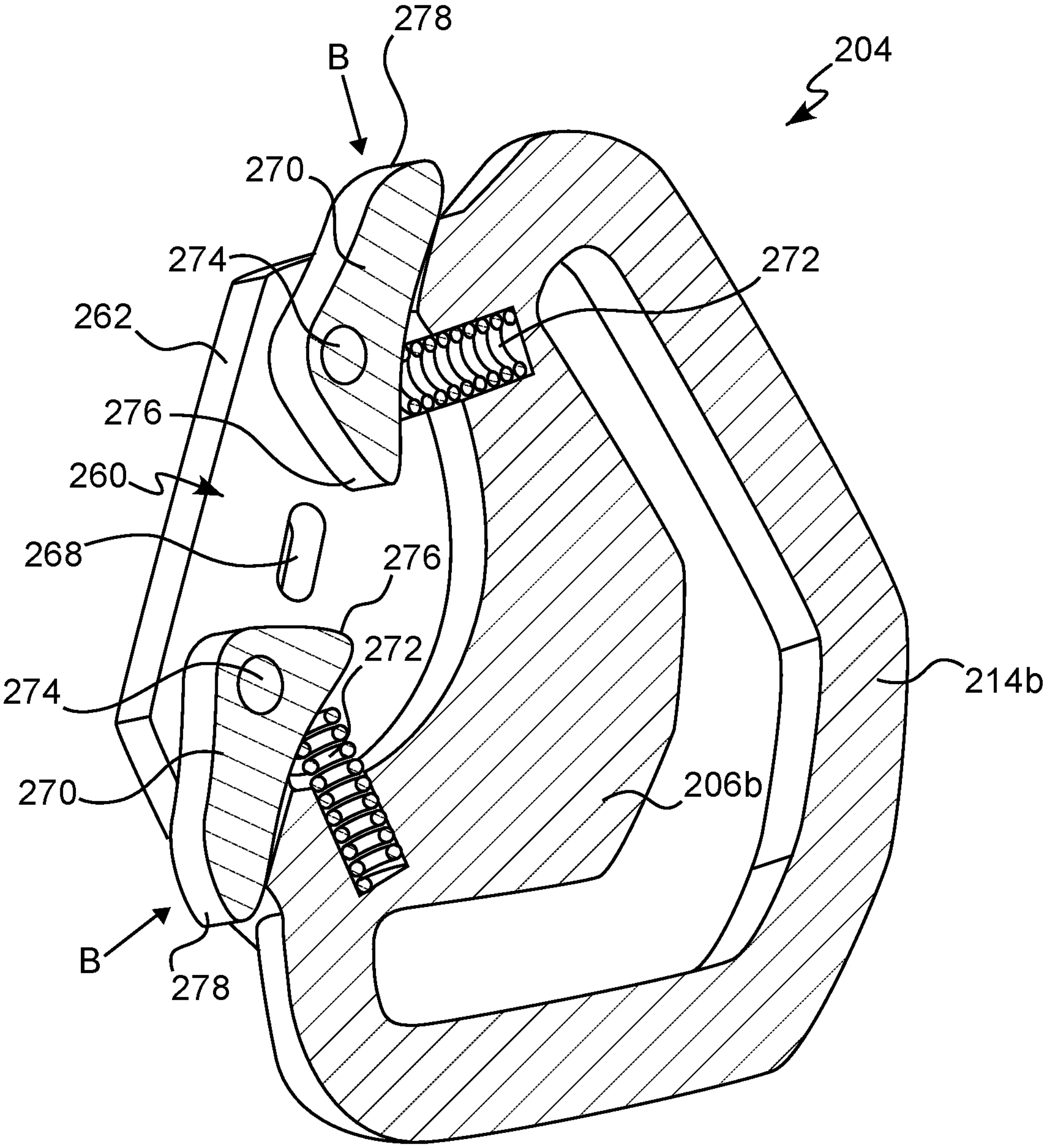
FIG. 4C is a front partial cross-sectional view of the second connector shown in FIG. 4B.

With reference to FIG. 4C, and with continued reference to FIGS. 4A-4B, the second connector 204 has a second portion of the locking and release mechanism 201 that is configured for interacting with the first portion of the locking and release mechanism 201 on the first connector 202 (i.e., the tab 238). In some non-limiting embodiments or aspects, the second portion of the locking and release mechanism 201 has a pair of locking arms 270 that are configured to releasably engage the at least a portion of the tab 238, such as the first latch 252 of the tab 238 of the first connector 202. Each locking arm 270 is movable between a first, locked position, where disengagement of the first latch 252 of the tab 238 from the slot 260 of the second connector 204 is prevented due to interference between at least a portion of the locking arms 270 and the first latch 252, and a second, unlocked position, where the first latch 252 of the tab 238 can be removed freely from the slot 260. Each locking arm 270 may be pivotally movable, rotatably movable, linearly movable, or movable in any direction via any combination of pivotal, rotatable, and linear movement between the first position and the second position.

With continued reference to FIG. 4C, each of the locking arms 270 is biased in the first position by a biasing member 272, such as a spring. Movement of the locking arms 270 from the first position to the second position in the direction of arrows B builds a restoring force in the biasing members 272 such that each locking arm 270 is restored to the first position after the force that causes the movement of the locking arms 270 is removed. Each of the locking arms 270 may be pivotally mounted about a pivot pin 274 for movement between the first position and the second position.

With continued reference to FIG. 4C, each locking arm 270 has an elongated shape with a locking tooth 276 on one end and a release tab 278 at an opposing end, with the pivot pin 274 positioned between the locking tooth 276 and the release tab 278. The locking arms 270 are arranged such that the locking teeth 276 are positioned opposite one another and spaced apart from each other in the first positon at a distance that is less than a width of the first latch 252 of the tab 238 (shown in FIG. 3A). In this manner, when the first latch 252 is inserted into the slot 260 and into a space between the locking arms 270, the first latch 252 will cause the locking arms 270 to pivot about their respective pivot pins 274 to deflect the locking arms 270 from the first position toward the second position. The locking teeth 276 may be angled relative to one another at an acute angle to facilitate movement of the locking arms 270 from the first position to the second position with the insertion of the first latch 252 in the slot 260 between the locking arms 270.

As shown in FIG. 4C, at least a portion of each locking arm 270, such as the release tab 278, protrudes from the second body 206*b* of the second connector 204. In some non-limiting embodiments or aspects, the release tab 278 of each locking arm 270 may be exposed such that it can be actuated by a user. To actuate the release tabs 270, the user urges the release tabs 270 in the direction of arrows B shown in FIG. 4C. Movement of the release tabs 278 in this direction moves the locking teeth 276 away from one another to enlarge the space between the locking arms 270, thereby permitting removal of the first latch 252 of the first connector 202 from the slot 260 of the second connector 204.

Each of the locking arms 270 is movable independently of the other locking arm 270. In this manner, the user must actuate both locking arms 270 to the second, unlocked position in order to remove the first connector 202 from the second connector 204. Actuation of one of the pair of locking arms 270 will not permit removal of the first latch 252 from the slot 260. In this manner, the locking and release mechanism 201 of the connection arrangement 200 has a redundant safety mechanism to prevent inadvertent disengagement of the first and second connectors 202, 204 due to accidental actuation of a single release tab 278.

Having described the structure of the connection arrangement 200, a method of disconnecting the first connector 202 from the second connector 204 and connecting the first connector 202 to the second connector 204 will now be described. To disconnect the first connector 202 from the second connector 204, the user first actuates both release tabs 278 by pivoting each locking arm 270 about the pivot pin 274 in a direction of arrows B in FIG. 4C. As noted herein, movement of one of the pair of locking arms 270 will not permit removal of the first latch 252 from the slot 260. Such movement of the release tabs 278 separates the locking teeth 276 from the tab 238 of the first connector 202. Once the release tabs 278 have been moved from a first position to a second position shown, the locking teeth 276 have been separated from the tab 238 of the first connector 202 to allow the first latch 252 of the tab 238 to be withdrawn from the slot 260 of the second connector 204 by moving the first connector 202 away from the second connector 204. The restoring force of the biasing members 272 causes the locking arms 270 to revert back to the first position once the actuating force is removed from the release tabs 278.

The first and second connectors 202, 204 can be connected together by inserting the tab 238 of the first connector 202 into the slot 260 of the second connector 204, such as by positioning the first latch 252 of the tab 238 in a space defined between the locking teeth 276. The first and second connectors 202, 204 are then moved toward each other until the locking teeth 276 engage the first latch 252. The locking arms 270 can be moved from the first position to the second position either manually, such as by actuating both release tabs 278 by pivoting each locking arm 270 about the pivot pin 274, or automatically, such as due to physical contact between the first latch 252 with the inclined surfaces of the locking teeth 276 that deflects the locking arms 270 to the second position. Movement of the locking arms 270 to the second position allows further insertion of the first latch 252 of the tab 238 in a space defined between the locking teeth 276 until the first latch 252 clears the locking teeth 276. The restoring force of the biasing members 272 causes the locking arms 270 to revert back to the first position once the actuating force is removed from the release tabs 278 and/or once the first latch 252 clears the locking teeth 276. The first connector 202 is thus locked with the second connector 204.

Figure 5:
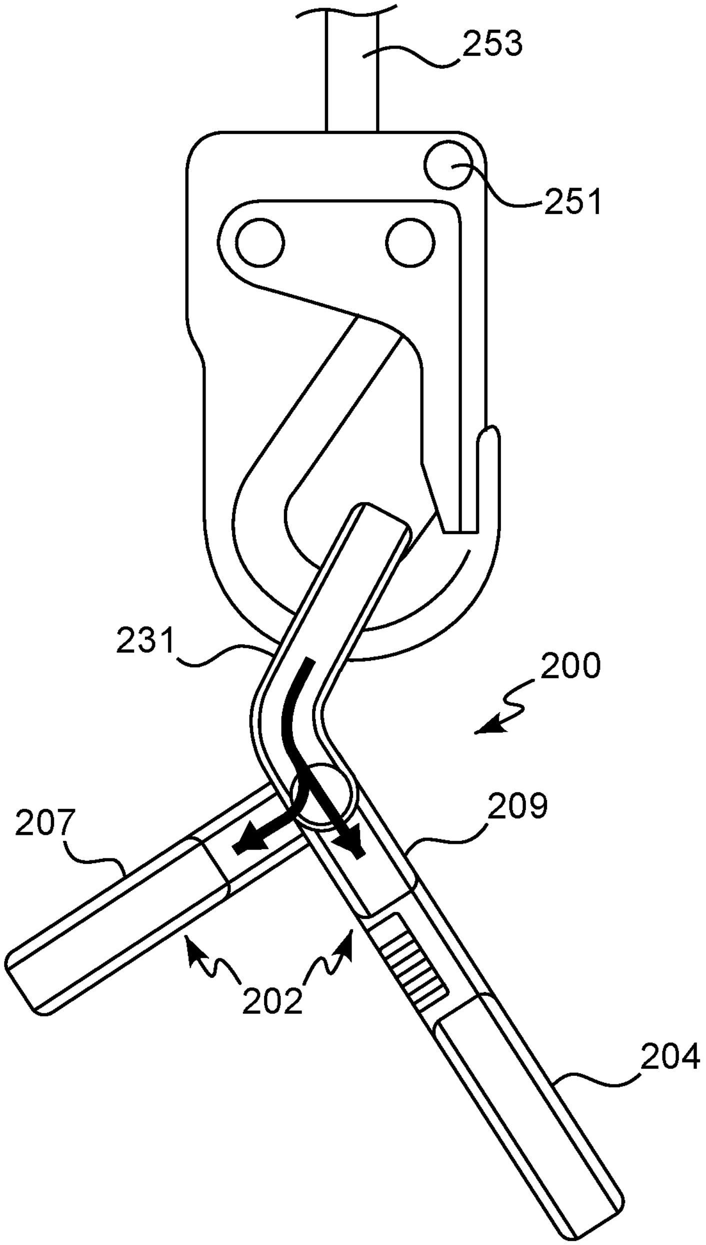
FIG. 5 is a side view of the harness connection arrangement in a simulated load situation showing a distribution of load forces.

With reference to FIG. 5, the connection arrangement 200 is shown under a simulated load condition, such as a load that may be experienced during a fall event. The attachment element 231 is connected to a connector 251 of a safety line 253 that may be connected to an anchoring point. During a fall event where the user is supported by the attachment element 231, significant load is placed on the connection arrangement 200 and the harness straps connected to the connection arrangement 200. As shown in FIG. 5, when under load, such as during a fall event, the attachment element 231 and the first body component 207 are articulated about the longitudinal axis 227 of the rod 225 relative to the second body component 209 and the second connector 204. In this manner, the components of the connection arrangement 200 are loaded in a direction in which they are designed to withstand the force. The connection arrangement 200 thus efficiently redirects energy through the structural components thereof to minimize forces on the components in directions in which the components are not designed to withstand the force. Furthermore, the straps that are connected to the fixed buckles of the first and second connectors 202, 204 can articulate to reduce shear forces on the webbing material.

Although the disclosure has been described in detail for the purpose of illustration based on what are currently considered to be the most practical, preferred, and non-limiting embodiments or aspects, it is to be understood that such detail is solely for that purpose and that the disclosure is not limited to the disclosed embodiments or aspects, but, on the contrary, is intended to cover modifications and equivalent arrangements that are within the spirit and scope of the appended claims. For example, it is to be understood that the present disclosure contemplates that, to the extent possible, one or more features of any embodiment can be combined with one or more features of any other embodiment.

What is claimed is:

1. A connection arrangement for use with a wearable body harness, the connection arrangement comprising:

a first connector comprising a first body component and a second body component connected to each other by a rod having a longitudinal axis; and a second connector removably connectable to the first connector, the second connector configured to receive a portion of the wearable body harness at an aperture extending through the second connector, wherein the first body component comprises a first tab, wherein the second body component comprises a pair of second tabs, the pair of second tabs being configured to receive the first tab therebetween for connection via the rod.

2. The connection arrangement of claim 1, wherein the first tab comprises a first through opening having a first axis that is coaxial with the longitudinal axis of the rod, and wherein the rod is inserted into the first through opening.

3. The connection arrangement of claim 2, wherein the second pair of tabs each comprise a second through opening with a second axis extending through the through openings, wherein the first axis and the second axis are coaxial with the longitudinal axis of the rod, and wherein the rod is inserted into the first through opening and the second through openings.

4. The connection arrangement of claim 3, further comprising an attachment element connected to the first body component and the second body component, wherein the attachment element has a pair of opposed terminal ends each having a through opening with an attachment element axis extending therethrough, wherein the pair of tabs of the second body component are received between the opposed terminal ends such that the first axis, the second axis, and the attachment element axis are coaxial with the longitudinal axis of the rod, and wherein the rod is inserted into the first through opening, the second through openings, and the terminal end through openings.

5. The connection arrangement of claim 1, wherein the first connector and the second connector are removably connectable to each other via a locking and release mechanism between a first, locked configuration, where the first connector and the second connector are connected to each other, and a second, unlocked configuration, where the first connector and the second connector are disconnected from each other.

6. The connection arrangement of claim 5, wherein the first connector has a first portion of the locking and release mechanism, and wherein the second connector has a second portion of the locking and release mechanism, wherein the first portion of the locking and release mechanism comprises:

a tab having a first end connected to the body of the first connector and a second, free end protruding away from the body of the first connector, and a first latch at the second end of the tab and protruding laterally outward relative to at least one lateral side of the tab, and wherein the second portion of the locking and release mechanism comprises:

an upper plate and a lower plate defining a slot therebetween and configured for receiving at least a portion of the tab, and a pair of locking arms disposed within at least a portion of the slot and configured for interacting with the tab, the pair of locking arms movable between a first, locked position and a second, unlocked position to allow movement of at least a portion of the tab into and out of the slot.

7. The connection arrangement of claim 6, wherein each of the pair of locking arms has a locking tooth at a first end and a release tab at a second end with a pivot pin positioned between the locking tooth and the release tab such that each locking arm is pivotally movable about the pivot pin.

8. The connection arrangement of claim 6, wherein each of the pair of locking arms is biased to the first position by a biasing member.

9. The connection arrangement of claim 1, wherein the first connector comprises a first buckle configured to connect to a first shoulder strap of the wearable body harness, and wherein the second connector comprises a second buckle configured to connect to the second shoulder strap of the wearable body harness.

10. The connection arrangement of claim 9, wherein the first buckle comprises a first bar spaced apart from the first connector by a first pair of posts and wherein the second buckle comprises a second bar spaced apart from the second connector by a second pair of posts.

11. A wearable body harness having a plurality of straps comprising:

a first shoulder strap and a second shoulder strap;

a first connector connected to the first shoulder strap, the first connector comprising a first body component and a second body component connected to each other by a rod having a longitudinal axis; and a second connector connected to the second shoulder strap and removably connectable to the first connector, wherein the first shoulder strap and the second shoulder strap are arranged in an X- shaped configuration at a front portion of the harness.

12. The wearable body harness of claim 11, wherein the first body component has a tab with a first through opening having a first axis that is coaxial with the longitudinal axis of the rod, and wherein the rod is inserted into the first through opening.

13. The wearable body harness of claim 12, wherein the second body component has a pair of tabs each having a second through opening with a second axis extending through the through openings, wherein the tab of the first body component is received in a space between the pair of tabs such that the first axis and the second axis are coaxial with the longitudinal axis of the rod, and wherein the rod is inserted into the first through opening and the second through openings.

14. The wearable body harness arrangement of claim 12, wherein the first connector further comprises an attachment element;

wherein each of the first body component, the second body component, and the attachment element are independently movable relative to each other about the longitudinal axis of the rod.

15. The wearable body harness of claim 14, wherein the attachment element has a pair of opposed terminal ends each having a through opening with an attachment element axis extending therethrough, wherein the pair of tabs of the second body component are received between the opposed terminal ends such that the first axis, the second axis, and the attachment element axis are coaxial with the longitudinal axis of the rod, and wherein the rod is inserted into the first through opening, the second through openings, and the terminal end through openings.

16. The wearable body harness of claim 11, wherein the first connector and the second connector are removably connectable to each other via a locking and release mechanism between a first, locked configuration, where the first connector and the second connector are connected to each other, and a second, unlocked configuration, where the first connector and the second connector are disconnected from each other.

17. The wearable body harness of claim 16, wherein the first connector has a first portion of the locking and release mechanism, and wherein the second connector has a second portion of the locking and release mechanism, wherein the first portion of the locking and release mechanism comprises:

a tab having a first end connected to the body of the first connector and a second, free end protruding away from the body of the first connector, and a first latch at the second end of the tab and protruding laterally outward relative to at least one lateral side of the tab, and wherein the second portion of the locking and release mechanism comprises:

an upper plate and a lower plate defining a slot therebetween and configured for receiving at least a portion of the tab, and a pair of locking arms disposed within at least a portion of the slot and configured for interacting with the tab, the pair of locking arms movable between a first, locked position and a second, unlocked position to allow movement of at least a portion of the tab into and out of the slot.

18. The wearable body harness of claim 17, wherein each of the pair of locking arms has a locking tooth at a first end and a release tab at a second end with a pivot pin positioned between the locking tooth and the release tab such that each locking arm is pivotally movable about the pivot pin.

19. The wearable body harness of claim 17, wherein each of the pair of locking arms is biased to the first position by a biasing member.

20. The wearable body harness of claim 11, wherein the first connector comprises a first buckle configured to connect to a first shoulder strap of the wearable body harness, and wherein the second connector comprises a second buckle configured to connect to a second shoulder strap of the wearable body harness.

21. A connection arrangement for use with a wearable body harness, the connection arrangement comprising:

a first connector comprising a first body component and a second body component; and a second connector removably connectable to the first connector, the second connector configured to receive a portion of the wearable body harness at an aperture extending through the second connector;

wherein the first body component and the second body component are movable relative to each other about an axis of a rod that connects the first body component and the second body component wherein the first body component comprises a first tab, wherein the second body component comprises a pair of second tabs, the pair of second tabs being configured to receive the first tab therebetween for connection via the rod.

22. The connection arrangement of claim 1, wherein the first body component and the second body component are movable relative to each other about the longitudinal axis of the rod.

23. The connection arrangement of claim 1, wherein the first tab comprises a unitary projection extending from a midpoint of the first body component, the first tab having a through hole configured to receive the rod.

24. The connection arrangement of claim 1, wherein the first tab is a tongue.

* * * * *